(12) United States Patent
Mitsui

(10) Patent No.: US 10,310,780 B2
(45) Date of Patent: Jun. 4, 2019

(54) SYSTEM AND CONTROL METHOD FOR INSTALLING PRINTER DRIVER

(71) Applicant: CANON KABUSHIKI KAISHA, Tokyo (JP)

(72) Inventor: Akihiro Mitsui, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/907,050

(22) Filed: Feb. 27, 2018

(65) Prior Publication Data
US 2018/0253265 A1 Sep. 6, 2018

(30) Foreign Application Priority Data
Mar. 2, 2017 (JP) .................................. 2017-039891

(51) Int. Cl.
G06F 15/00 (2006.01)
G06F 3/12 (2006.01)
G06K 1/00 (2006.01)

(52) U.S. Cl.
CPC .......... *G06F 3/1225* (2013.01); *G06F 3/1203* (2013.01); *G06F 3/1288* (2013.01)

(58) Field of Classification Search
CPC ..... G06F 3/1225; G06F 3/1288; G06F 3/1203
USPC ............................... 358/1.15, 1.1, 1.13, 1.14
See application file for complete search history.

(56) References Cited

U.S. PATENT DOCUMENTS

| 2010/0225946 | A1* | 9/2010 | Fukasawa | G06F 3/1204 |
| | | | | 358/1.13 |
| 2018/0077305 | A1* | 3/2018 | Nishio | H04N 1/00503 |
| 2018/0143793 | A1* | 5/2018 | Kobayashi | G06F 3/1205 |

FOREIGN PATENT DOCUMENTS

JP 2006-252095 A 9/2006

* cited by examiner

*Primary Examiner* — Douglas Q Tran
(74) *Attorney, Agent, or Firm* — Canon U.S.A., Inc. IP Division (57) ABSTRACT

In a system having a client and a server according to an exemplary embodiment of the present invention, the server adds to a database of a server of a first printer driver a path of a logical printer corresponding to a second printer driver. The path of the logical printer is added to the database of the first printer driver of a client by the path of the logical printer being added to the database of the server. And then, the client installs the second printer driver based on the path of the logical printer added to the database of the client by the first printer driver being operated.

7 Claims, 10 Drawing Sheets

V4 PRINTER DRIVER INSTALLATION

NEW V4 PRINTER DRIVER IS FOUND.
INSTALL NEW DRIVER BY TAPPING.

BASICS | LAYOUT | PAPER FEEDING | FINISH | PRINT QUALITY | COVER | SUPPORT/DEVICE

DOCUMENT SIZE: A4
OUTPUT PAPER SIZE: SAME AS DOCUMENT SIZE  DETAILS...
PAPER TYPE: PLAIN PAPER
ORIENTATION OF PRINTING: PORTRAIT
NUMBER OF COPIES: 1 COPY/COPIES (1-9999)

V4 PRINTER DRIVER INSTALLATION
NEW V4 PRINTER DRIVER HAS BEEN INSTALLED.
USE "XXXX" FOR PRINTING FROM NOW ON.
[OK] [CANCEL]

DETAILS...

STAPLER: NOT STAPLED
☑ UPPER LEFT (ONE LOCATION)  ◻ LEFT TO RIGHT
COLOR MODE: COLOR
OUTPUT METHOD: PRINT  DETAILS...

FAVORITE
2 in 1 (SINGLE-SI...
2 in 1 (DOUBLE-S...
DOUBLE-SIDED
CONFIDENTIAL

[REGISTER] [RESET PRINT SETTINGS TO DEFAULT]

[OK] [CANCEL] [HELP]

SYSTEM AND CONTROL METHOD FOR INSTALLING PRINTER DRIVER

BACKGROUND OF THE INVENTION

Field of the Invention

The present invention relates to a technique for installing a printer driver.

Description of the Related Art

A technique for installing a printer driver on a client by a manual operation has been known. Japanese Patent Application Laid-Open No. 2006-252095 discusses a method for installing a printer driver using an installer.

SUMMARY OF THE INVENTION

A system according to embodiments of the present invention includes a client and a server, wherein the server includes an addition unit configured to add to a database of the server of a first printer driver a path of a logical printer corresponding to a second printer driver, wherein the path of the logical printer is added to the database of the first printer driver of the client by the path of the logical printer being added to the database of the server, and wherein the client includes an installation unit configured to install the second printer driver based on the path of the logical printer added to the database of the client by the first printer driver being operated.

Further features of the present invention will become apparent from the following description of exemplary embodiments with reference to the attached drawings.

DESCRIPTION OF THE EMBODIMENTS

When a printer driver is updated between shared printers implemented between clients and a server, it is necessary to manually update a printer driver of, for example, a different architecture. With a method for manually executing an installer on each client, an issue may arise in that an operational burden increases with an increasing number of clients.

According to an exemplary embodiment of the present invention, by contrast, the operational burden of the client is reduced by causing the client to automatically install the printer driver even in a shared printer environment.

In a computer environment of large enterprises, for example, a shared printer environment in which one server manages a few hundred clients is used to manage printers and printer drivers. In a shared printer environment, an operating system updates the printer driver by managing coordination between the server and the clients. When the printer driver of the server is updated, databases associated with files of the updated printer driver are delivered also to the clients by the operating system so that the environments of all the clients are updated.

A V4 printer driver of a new architecture that is incompatible with a conventional printer driver (hereinafter, called a V3 printer driver) has been introduced from Windows 8® onward of Microsoft®. Currently, the V3 printer driver and the V4 printer driver can coexist for use, but if the operating system is updated in the future, it is assumed that only the V4 printer driver may be installable. Accordingly, also in the above shared printer environment, it is desirable to automatically replace V3 printer drivers with V4 printer drivers.

However, the server normally recognizes the V4 printer driver as a new driver and thus, the method for updating the printer driver by the operating system described above cannot be used. If the V3 printer driver is forced to be replaced with the V4 printer driver by overwriting, the database does not operate correctly due to inconsistency and, in addition, cannot be restored to its original state.

In the present specification, therefore, a method for automatically installing a V4 printer driver without overwriting an existing V3 printer driver by utilizing the above method for updating a printer driver by an operating system will be described.

Hereinafter, exemplary embodiments of the present invention will be described with reference to the drawings.

Figure 1:
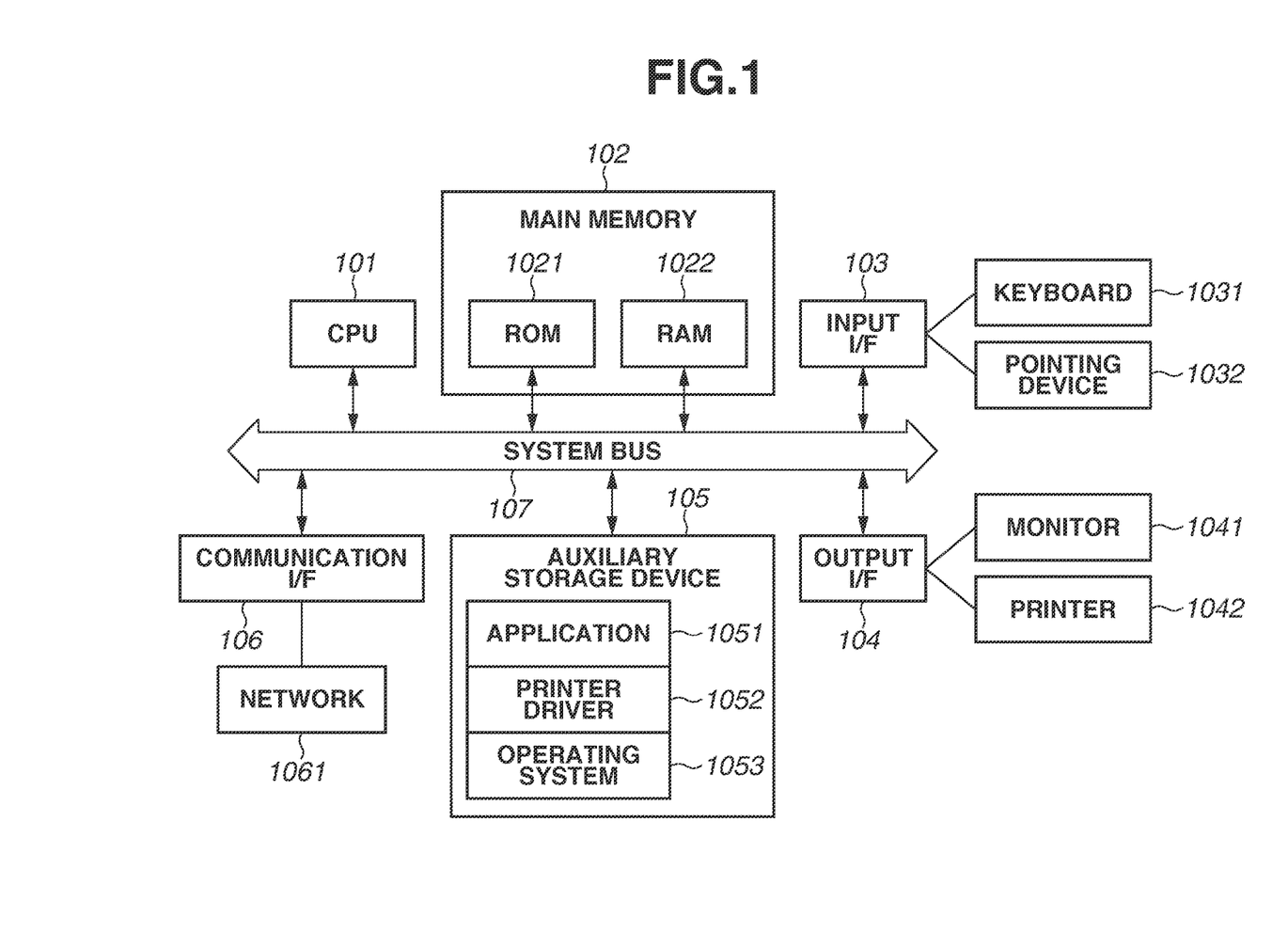
FIG. 1 is an exemplary block diagram of hardware and software of a computer.

FIG. 1 is a block diagram of hardware of two information processing apparatuses (computers), i.e., a server 401 and a client 402 described below, and a portion of software. Unless specifically mentioned, it is needless to say that embodiments of the present invention can be applied to any of a single function, a system including a plurality of apparatuses, and a system connected via a network to perform processing, as long as the function(s) of the present disclosure can be performed. Further, the hardware configurations of the server 401 and the client 402 can be different.

A central processing unit (CPU) 101 controls the entire information processing apparatus according to a program stored in a read only memory (ROM) 1021 or a random access memory (RAM) 1022 of a main memory 102 or an auxiliary storage device 105. The RAM 1022 is also used as a work area by the CPU 101 to perform various kinds of processing. The auxiliary storage device 105 records an application 1051, a printer driver 1052, an operating system (OS) 1053 and the like. An input device such as a keyboard 1031 and a pointing device 1032 represented by a mouse/touch panel or the like is a device for a user to give various instructions to the computer through an input interface (I/F) 103. An output I/F 104 is an interface to output data to the outside and outputs data to an output device such as a monitor 1041 and a printer 1042. The printer 1042 can be connected not only by a local input/output (I/O) bus connected directly, but also via a network 1061 connected through a communication I/F 106. A system bus 107 is a shared data system bus to exchange data between I/Fs and modules.

Figure 2:
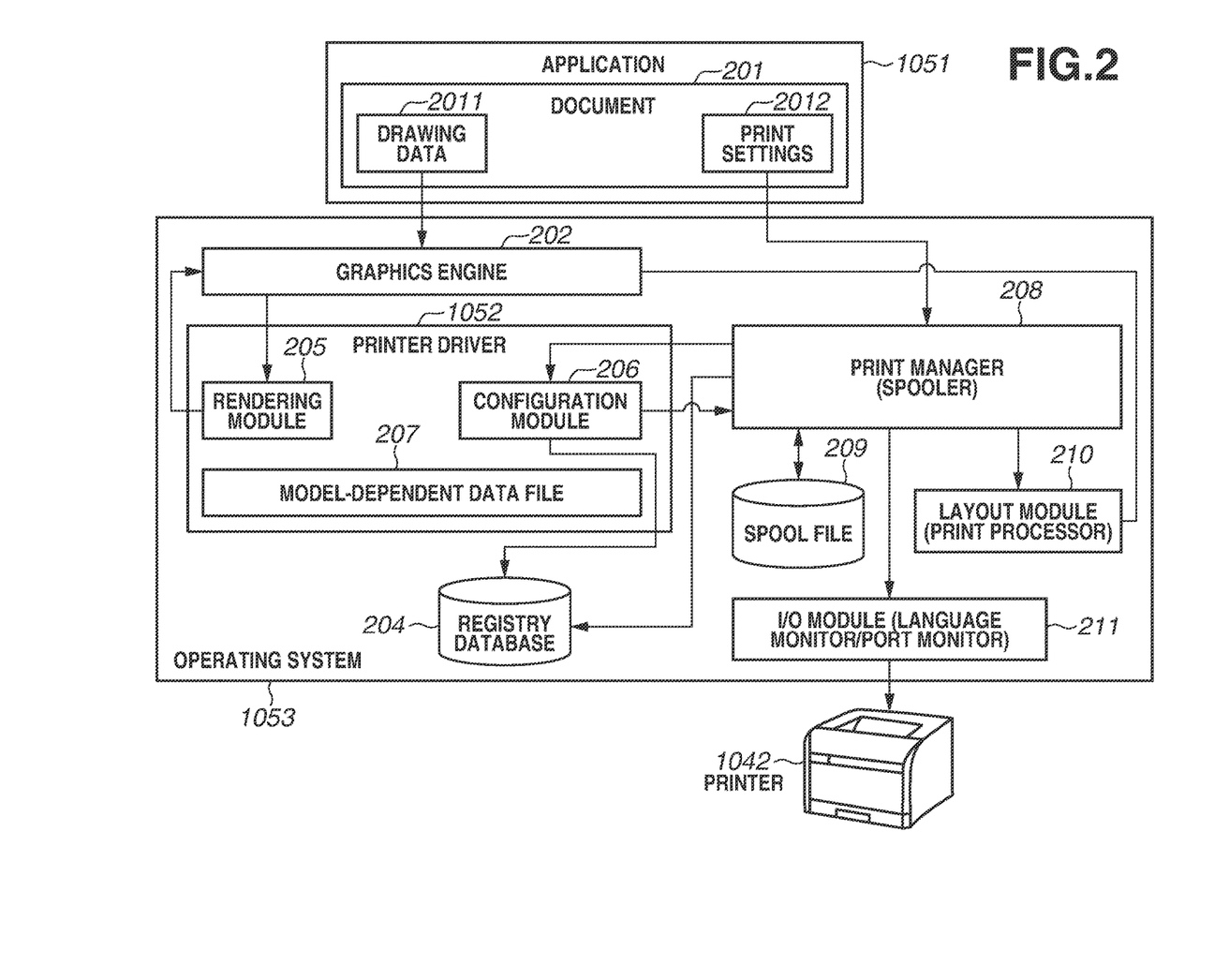
FIG. 2 is an exemplary block diagram of a print processing system of a V3 printer driver.
Figure 3:
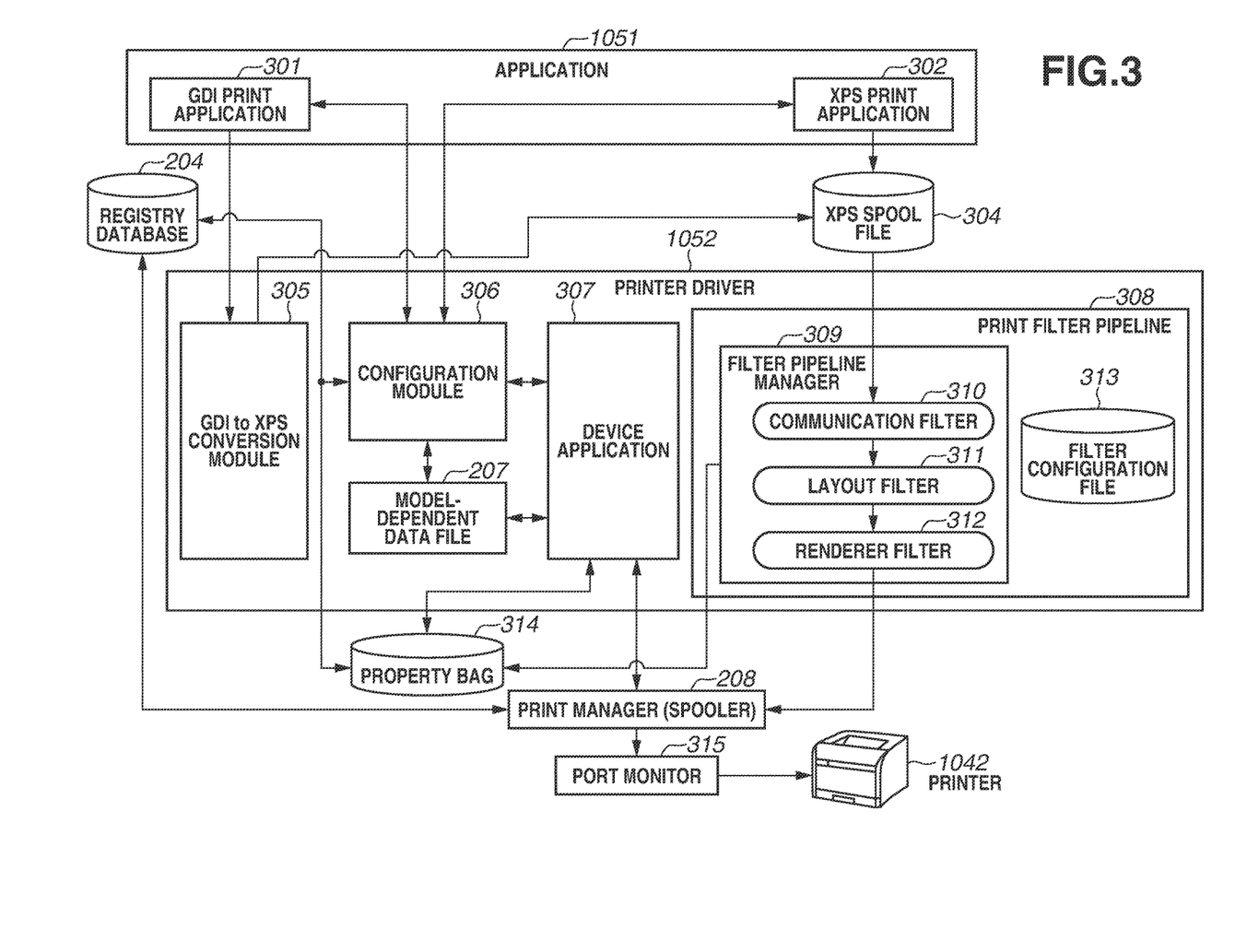
FIG. 3 is an exemplary block diagram of a print processing system of a V4 printer driver.

In addition, a software configuration of the information processing apparatus as illustrated in FIGS. 2 and 3 and each step of flowcharts described below are implemented by the CPU 101 performing processing based on a program stored in the auxiliary storage device 105.

The printer 1042 can be a printing apparatus having only a print function, a FAX apparatus having only a FAX function, or a multifunction peripheral having a plurality of functions such as a scan function and the print function. Incidentally, the printer 1042 can also be called an image processing apparatus or an image formation apparatus.

FIG. 2 illustrates a print processing system using a computer. The application 1051, the printer driver 1052, and the operating system 1053 are stored in the auxiliary storage device 105 in FIG. 1. A graphics engine 202 and a print manager 208 are modules included in the operating system 1053.

The user uses the input device such as the keyboard 1031 and the pointing device 1032 to perform print processing of a document 201 displayed on the monitor 1041 of the output device and created using the application 1051.

A user interface of the printer driver 1052 is provided by a configuration module 206. An optional device configuration of the printer 1042 and settings that should be held such as environment settings for each user are stored by the printer driver 1052 in a registry database 204 of the operating system 1053. Default values of print settings 2012 for each user are stored in the registry database 204 by the print manager 208 of the operating system 1053.

When the creation of the print settings 2012 is finished, print processing is performed by the user and the application 1051 notifies the operating system 1053 of the print processing. The operating system 1053 performs drawings to the designated printer driver 1052 through the graphics engine 202. If layout processing is designated by the print settings 2012, processing is performed by a layout module 210 by temporarily creating a spool file 209 before proceeding to a rendering module 205 of the printer driver 1052. The printer driver 1052 to which drawing data has been sent converts the data into a data language that can be understood by the printer, that is, a printer control language by the rendering module 205.

The converted data is sequentially stored as the spool file 209. The print manager 208 acquires the spool file 209 and manages a schedule of print processing by handling the spool file 209 as a print job. When the printer is ready, the print manager 208 successively sends print job data to the printer 1042 via an I/O module 211. In this manner, print data from the application is converted into a printer control language to perform print processing. The printer driver described here is called a V3 printer driver.

FIG. 3 is a block diagram of a V4 printer driver print system. The V4 printer driver print system is a system that performs printing using a file format called Extensible Markup Language (XML) Paper Specification (hereinafter, abbreviated as XPS) as spool data. Software components 1051 and 1052 in FIG. 3 are stored in the auxiliary storage device 105 and loaded into the RAM 1022 for execution, that is, for being executed by the CPU 101. The V4 printer driver print system operates on the operating system 1053. The print manager 208, a graphics device interface (GDI) to XPS conversion module 305, and a filter pipeline manager 309 are modules included in the operating system 1053. The GDI to XPS conversion module 305 and the filter pipeline manager 309 are included in the printer driver 1052, and are modules dedicated to the printer driver 1052 and provided by the operating system 1053. Filters 310 to 312, as the filters of the printer driver 1052 and the filter pipeline manager 309, and a device application 307 are stored in the auxiliary storage device 105 in FIG. 1 as the printer driver 1052. A GDI print application 301 (hereinafter, abbreviated as a GDI application) and an XPS print application 302 (hereinafter, abbreviated as an XPS application) are stored in the auxiliary storage device 105 in FIG. 1 as the application 1051.

The device application 307 is a kind of the printer driver 1052, but is installed as a separate program from the printer driver. If the device application 307 is intended for a desktop, the device application 307 can be incorporated into the printer driver 1052. When the printer driver 1052 is installed, the device application 307 is automatically installed from a store server of a cloud via a network. Optional devices of the printer 1042 and environment settings for each user are stored by the printer driver in the registry database 204 of the operating system or in a property bag 314. Default values of print setting data are stored in the registry database 204 by the print manager 208 of the operating system. The registry database 204 and the property bag 314 are stored in the auxiliary storage device 105.

The V4 printer driver print system is characterized in that an XPS spool file 304 based on drawing data is always generated during printing. When the XPS spool file 304 is generated, processing is transferred to a print filter pipeline 308. The print filter pipeline 308 is a mechanism by which printing is performed by passing through a plurality of filters and a filter configuration file 313 controls the number and order of filters. The number and type of filters are different depending on the printer driver 1052. For example, in addition to the three filters in FIG. 3, an encryption filter to encrypt a print job can be further included.

Print jobs are sent to the print manager 208 that manages the schedule of print processing, and the print jobs are successively registered in a queue. The print manager 208 communicates with the printer 1042 and, as soon as the printer 1042 becomes ready for printing, sends the print jobs through a port monitor 315 in the order of registering in the queue.

Converting drawing data and print setting data into print jobs as described above is a main role of the printer driver before print processing is performed by the information processing apparatus.

In the present exemplary embodiment, the expression of the printer driver is used because embodiments of the present invention are described using print processing, but embodiments of the present invention can also be applied to FAX transmission processing. In that case, instead of a renderer filter 312, a FAX filter that creates FAX data is mounted to become a FAX driver that sends data to a FAX device.

Figure 4:
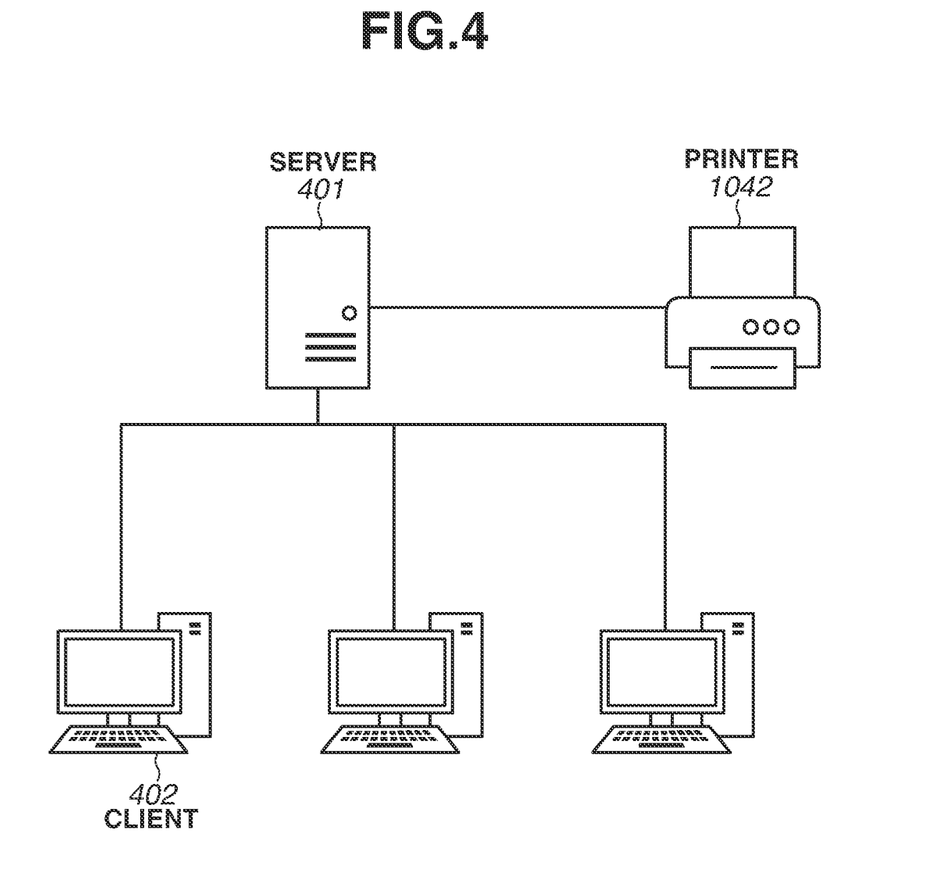
FIG. 4 is a block diagram of a shared printer environment by clients and a server.

FIG. 4 is a diagram illustrating a shared printer environment in which a printer is shared and used in a server/client network environment. The server 401 is connected to the printer 1042 via a network or a serial cable of a universal serial bus (USB). After the printer driver 1052 is installed on the server 401, normal printing can be performed.

The server 401 can also share the printer driver 1052 as a function of the operating system 1053. If the printer driver 1052 is shared, the client 402 connected to the server 401 can be connected to a printer queue (logical printer) of the server 401. When the client 402 is connected to the shared printer queue of the server 401 by a user's operation, data of the registry database 204 associated with the printer driver 1052 is downloaded from the server 401. When the printer driver 1052 is shared, the server 401 can give a dedicated shared queue name (logical printer name). The shared queue name is expressed, like "\\SERVER001\SHAREPRINTER01", in a concatenated form (logical printer path) of a server name and a sharing-dedicated queue name.

The client 402 connected to the server 401 performs printing by either client side rendering (CSR) or server side rendering (SSR). When CSR is used, the printer driver 1052 downloaded to the client is used to create a print job and the print manager (spooler) 208 sends the print job to the server 401. The server 401 sends the print job, sent from the client 402, directly to the printer 1042. When SSR is used, the client 402 sends the spool file 209 or the XPS spool file 304 to the server 401 and the server 401 creates a print job using the printer driver 1052. When SSR is used, printing can be performed comfortably even if a processing capability of the client 402 is low because the server 401 performs print processing. However, if the load on the server 401 increases, information of all clients cannot be sent to the server 401 and thus data of print jobs may be incomplete. Whether CSR or SSR is selected can be switched by a switch of the registry database 204 of the server 401.

If the V4 printer driver is not installed directly on the client, the client always operates as SSR. The reason therefor will be described. In the V4 printer driver, when the client is connected to the server 401, all of the printer driver 1052 are not necessarily downloaded to the client 402. Only a model-dependent data file 207 and the property bag 314 are downloaded while the device application 307 and each filter are not downloaded. The device application 307 and each filter can be made usable in a shared printer environment as well, if the V4 printer driver is installed directly on the client 402. The device application 307 can also be installed separately from outside. Thus, as no filter is present if the V4 printer driver is not installed directly on the client in a shared printer environment, the client always operates as SSR.

If the V4 printer driver is installed directly on the client, on the other hand, the installed V4 printer driver can directly be used for lacking files and modules needed for operation, and thus the client can be operated also as CSR. Examples of a method for installing the V4 printer driver directly on the client 402 include a method for installing just like a normal printer driver and a method for installing by downloading from a Windows® Update server in the cloud. When the client 402 is connected to the shared printer of the server 401, the client 402 checks a server on the cloud before downloading the printer driver 1052 from the server 401 and, if a V4 printer driver is found on the server on the cloud, downloads the V4 printer driver preferentially.

The development and updating of a shared printer environment of the V4 printer driver, as a main topic of the present exemplary embodiment, will be described with reference to the flowcharts of FIGS. 6, 5, and 7.

Figure 6:
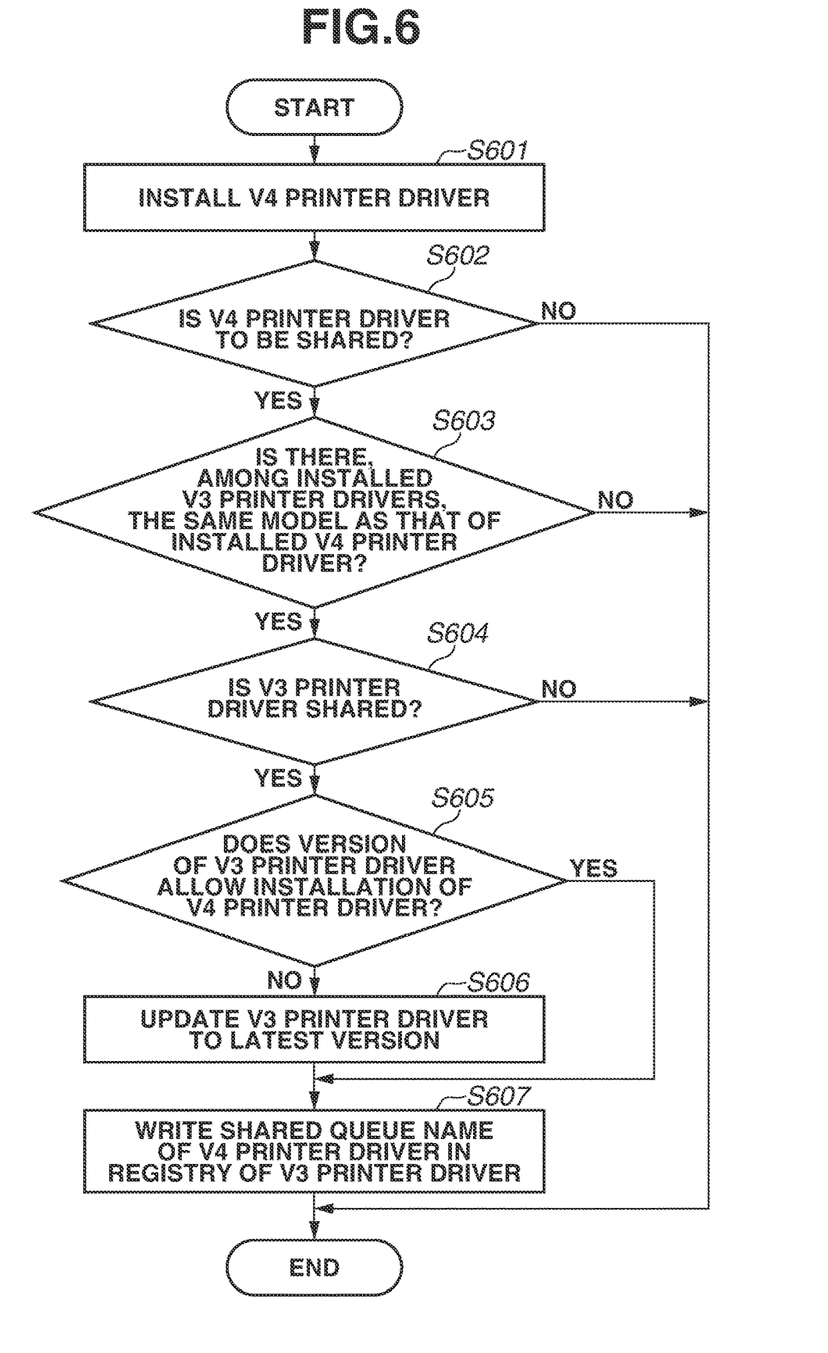
FIG. 6 is a flowchart illustrating processing for installing on the server by a V4 installer.
Figure 7:
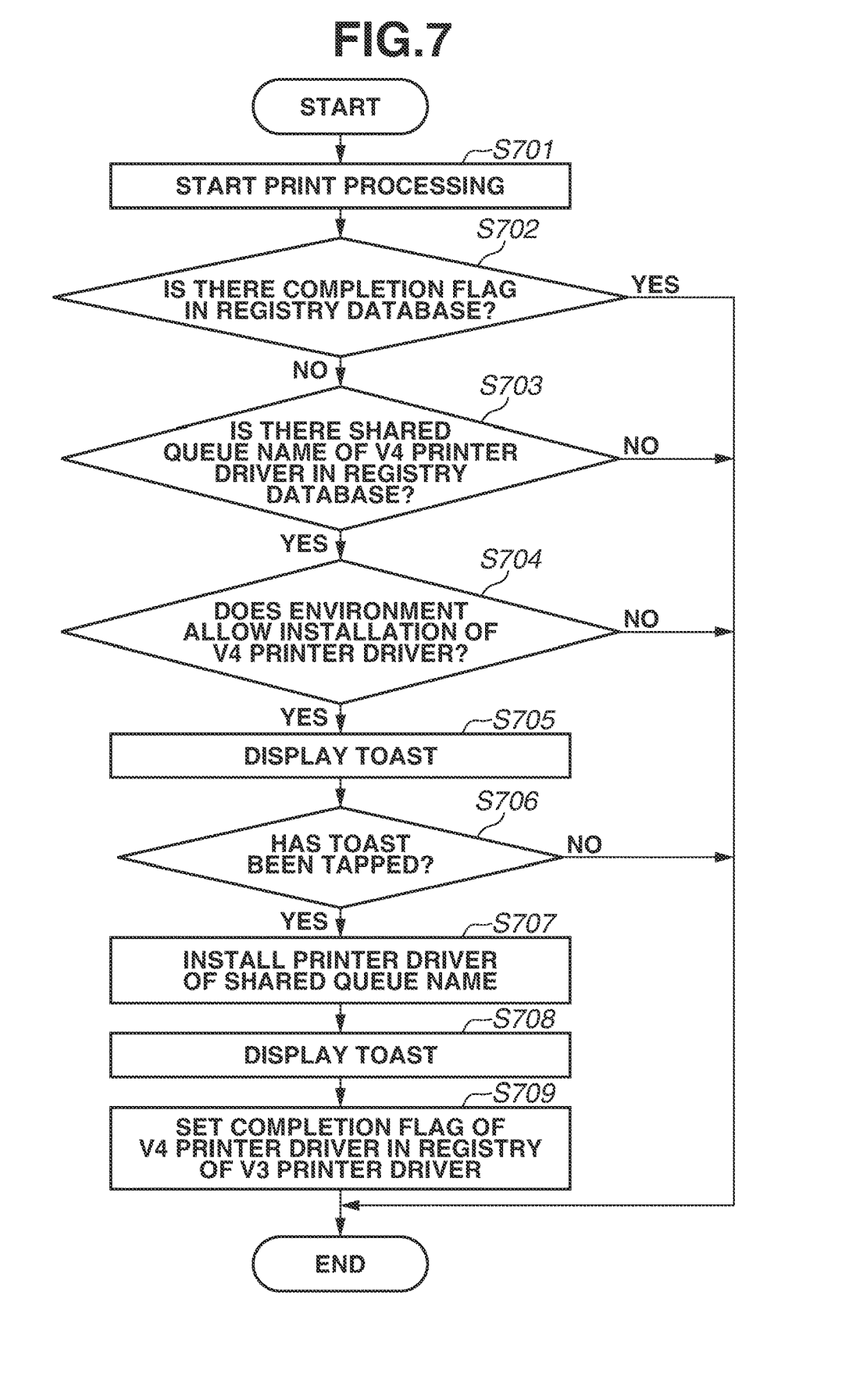
FIG. 7 is a flowchart illustrating install processing by the V3 printer driver of the client.

In the flowchart of FIG. 6, an operation of an installer of the V4 printer driver will be described. The installer described in the present specification is the application 1051 to install the V4 printer driver. The installer internally holds the V4 printer driver to be installed and the V3 printer driver for updating.

In step S601, the installer of the V4 printer driver installs the V4 printer driver for the operating system 1053 on the server 401. Because the V4 printer driver has a different model name from the V3 printer driver, the V4 printer driver is basically installed as a separate printer from the V3 printer driver. If the model name of the V4 printer driver is precisely identical to that of the V3 printer driver, the V3 printer driver can forcibly be overwritten, but incorrect operations occur frequently such as inconsistencies of the registry database 204 and it is also difficult to restore the original state. Therefore, the model name of the V4 printer driver is generally made not to match that of the V3 printer driver.

In step S602, the installer of the V4 printer driver determines whether to share the V4 printer driver based on an instruction from the user. If the V4 printer driver is determined to be shared (YES in step S602), the installer of the V4 printer driver searches for the V3 printer driver already installed on the server 401. In step S603, the installer of the V4 printer driver determines whether, among the V3 printer drivers searched for, there is the same model as that of the installed V4 printer driver. To determine whether the model is the same, the installer of the V4 printer driver has an association table for the model name of the V4 printer driver and that of the V3 printer driver, and uses the table to determine the model. In step S604, the installer of the V4 printer driver determines whether the relevant V3 printer driver is shared. If the relevant V3 printer driver is shared (YES in step S604), then in step S605, the installer of the V4 printer driver checks whether the V3 printer driver already installed on the server 401 is of a version allowing installation of the V4 printer driver based on processing in FIG. 7 described below. If the driver of a version allowing the installation of the V4 printer driver or a later version is not installed on the client (NO in step S605), in step S606, the installer of the V4 printer driver updates the V3 printer driver of the server 401 by installing the latest version of the V3 printer driver held by the installer. If the V3 printer driver of the server 401 is updated, the V3 printer driver of the client 402 is also updated successively based on the flowchart in FIG. 5 described below. Lastly, in step S607, the installer of the V4 printer driver describes a shared queue name corresponding to the V4 printer driver installed in step S601 in the registry database 204 of the V3 printer driver. As a result, the path of the logical printer corresponding to the V4 printer driver is added to the database of the V3 printer driver of the server.

The V4 printer driver is installed on the server 401 by the processing in FIG. 6 and also the V3 printer driver is updated if necessary, which completes preparations.

Using the flowchart in FIG. 5, how the operating system 1053 of the server 401 updates the printer driver 1052 of the shared printer will be described.

If the printer driver 1052 has been updated by installation on the server 401 or the registry database of the printer driver 1052 has been updated in step S501, the server 401 enters processing for updating the shared printer. In step S502, the server 401 determines whether the printer driver 1052 is shared as a shared printer. If the printer driver 1052 is determined to be a shared printer (YES in step S502), then in step S503, the server 401 sets an update flag indicating update installation in the registry database 204 of the shared printer. The operating system 1053 of the client 402 periodically monitors the update flag of the server 401 and, upon detecting a change of the update flag, makes an update request to the server 401.

If the update request comes from the connected client 402 (YES in step S504), then in step S505, the server 401 checks whether the printer driver 1052 has been updated by installation. Whether the printer driver 1052 has been updated by installation is determined based on whether there is any driver of the same architecture and the same model name among the printer drivers 1052 already installed on the server 401. If the printer driver 1052 has been updated by installation (YES in step S505), then in step S506, the server 401 sends, to the client 402, files and modules of the printer driver 1052 updated in response to the update request. By the processing in step S506, the V3 printer driver updated in step S606 of FIG. 6 is also sent to the client 402 so that the V3 printer driver of the client 402 is also updated.

In step S507, the server 401 also sends, to the client 402, information of the registry database 204 that has been updated. By the processing in step S507, the shared queue name added to the registry database of the server 401 in step S607 of FIG. 6 is also added to the registry database of the client 402. In this way, by the path of the logical printer being added to the database of the V3 printer driver of the server, the path of the logical printer is also added to the database of the V3 printer driver of the client.

The server 401 always waits for an update request from the client 402 and does not need to grasp all of many connected clients 402 by returning update files or data in response to an update request from the client 402. In this manner, in a shared printer environment, when the printer driver 1052 of the server 401 is updated, the operating system 1053 automatically updates the printer driver 1052 of the client 402.

The method for installing the V4 printer driver shared by the server 401 by the V3 printer driver installed on the client 402 will be described with reference to the flowchart in FIG. 7. In step S701, the V3 printer driver of the client 402 starts print processing by a user's operation. When the print processing is finished, in step S702, the V3 printer driver of the client 402 checks whether an installation complete flag by processing in step S709 described below is set in the registry database 204. If the flag is not set (NO in step S702), then in step S703, the V3 printer driver checks whether the shared queue name of the V4 printer driver is described in the registry database 204.

Figure 5:
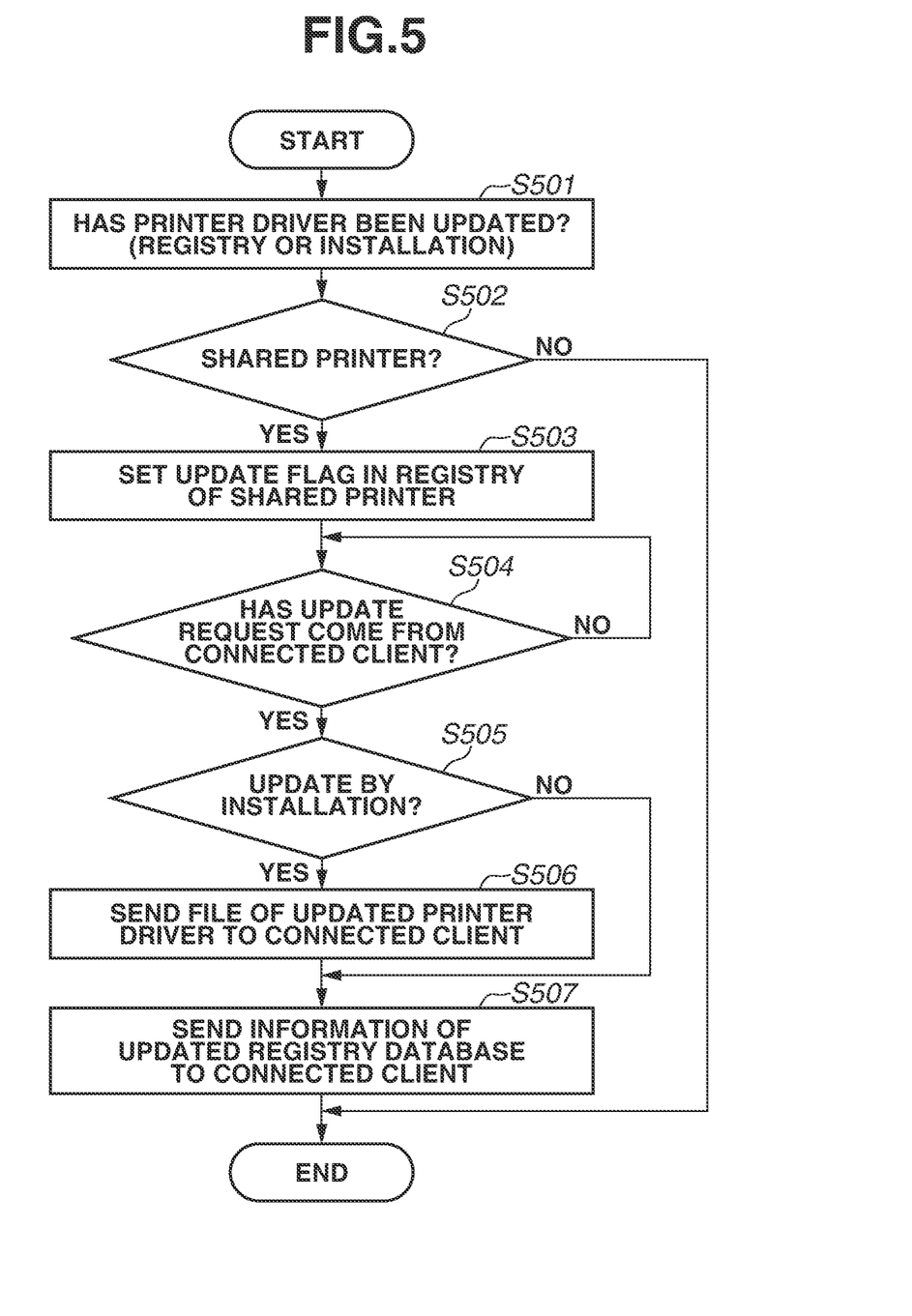
FIG. 5 is a flowchart illustrating processing for updating a printer driver by an operating system.

The shared queue name is shared by the registry database 204 of the server 401 due to the processing in step S507 of FIG. 5. If the shared queue name is described (YES in step S703), then in step S704, the V3 printer driver checks whether the current environment of the client 402 is an environment in which the V4 printer driver can be installed. Because the V4 printer driver can be installed only on the operating system 1053 that is relatively new, the V4 printer driver is not always installable in all environments in which the V3 printer driver is operating. Thus, the V3 printer driver checks whether the version of the operating system 1053 allows the installation of the V4 printer driver.

Figure 8:
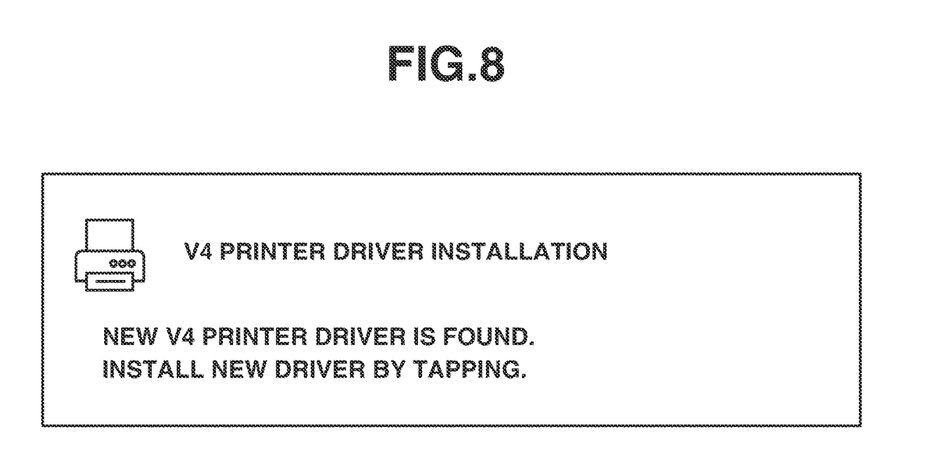
FIG. 8 is a toast display notified before the V3 printer driver starts installation.

If the current environment allows the installation (YES in step S704), then in step S705, the V3 printer driver displays a toast to notify the user that a new driver has been found. The toast is as illustrated in FIG. 8 and is displayed on a display screen of the client 402 for a fixed time. The toast functions as a confirmation window to see whether the user confirms the installation of the V4 printer driver, and the confirmation window accepts an instruction to install the V4 printer driver from the user by being tapped.

In step S706, the V3 printer driver determines whether the toast has been tapped by the user through the mouse, the touch panel or the like. If the toast has been tapped (YES in step S706), then in step S707, the operating system 1053 is instructed to install the V4 printer driver from the server 401 described in the shared queue name described in the registry database 204. The V4 printer driver described in the shared queue name is the printer driver installed on the server 401 in step S601 of FIG. 6. With the operation of the V3 printer driver, the client installs the V4 printer driver based on the path of the logical printer added to the database of the V3 printer driver of the client. If, as described above, a V4 printer driver of the same model is available in the cloud, the V4 printer driver can be installed from the server on the cloud.

Figure 9:
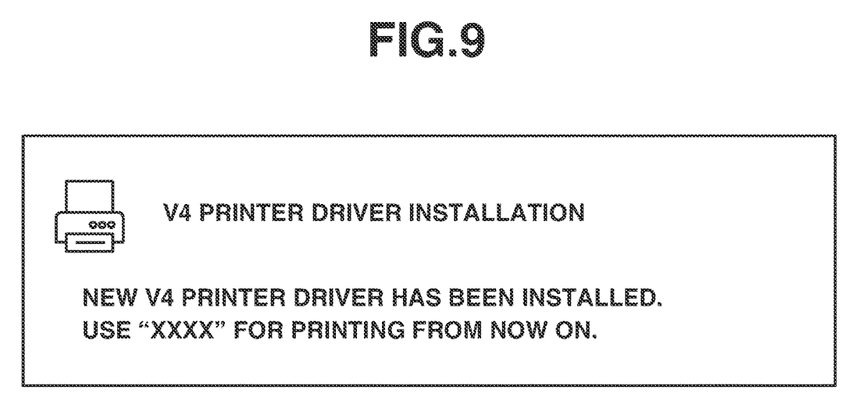
FIG. 9 is a toast display notifying that the installation by the V3 printer driver is completed.

When the installation is finished, in step S708, the V3 printer driver displays a toast to notify the user of the completion of installation. The toast functions as a notification screen that notifies the user that the V4 printer driver has been installed, and the shared queue name described in the registry database 204 is displayed in the part of "XXXX" on the notification screen illustrated in FIG. 9.

When the installation of the V4 printer driver is finished, in step S709, the V3 printer driver sets a flag of installation completion in the registry database 204. In the registry database 204 describing the flag, the flag is stored in an area dedicated to the client 402, instead of data shared with the server 401. By storing the flag, reinstallation of the V4 printer driver is prevented when printing is performed next time.

In this manner, the V3 printer driver of the client 402 in a shared printer environment automatically installs the V4 printer driver of the same model at the time of printing.

Figure 10:
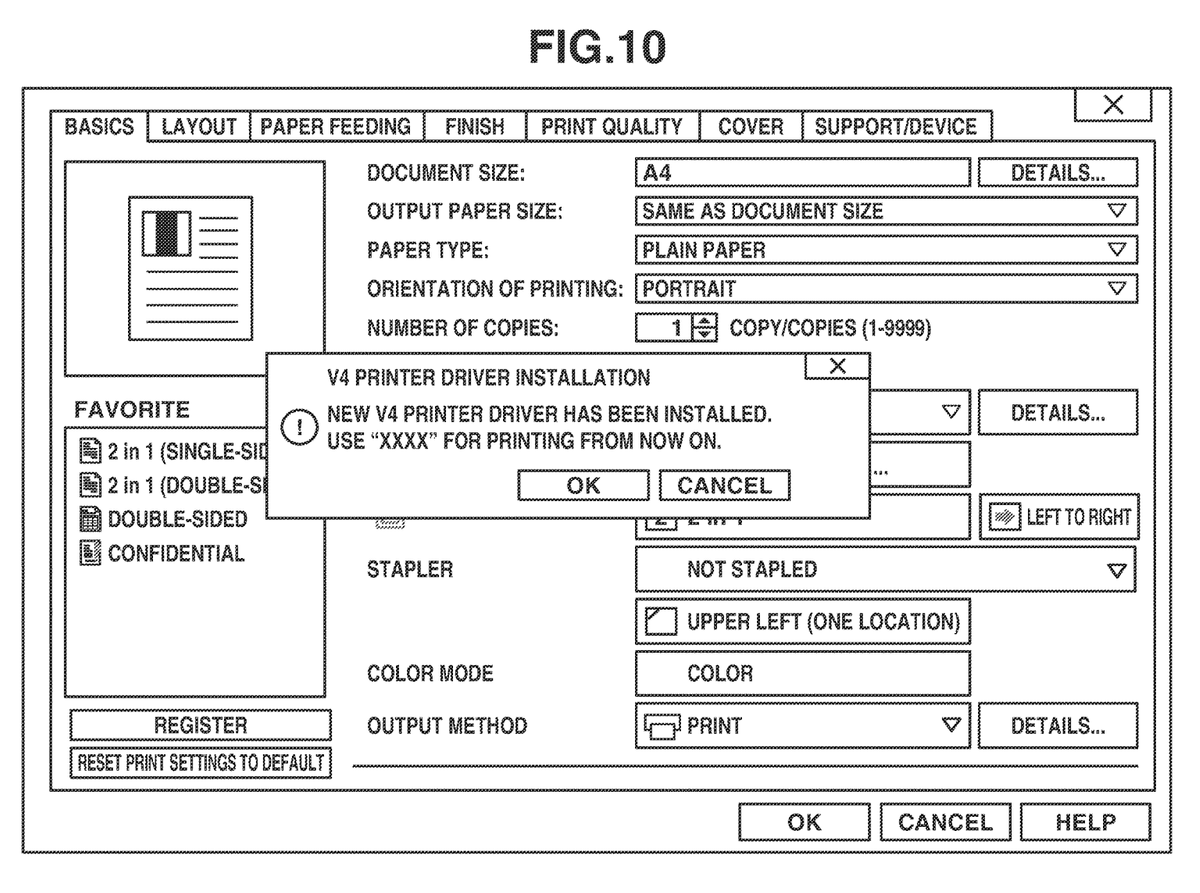
FIG. 10 is a print setting screen of the V3 printer driver for notifying a user.

When the completion flag is set in the registry database 204, the V3 printer driver of the client 402 can display a message box to call attention of the user when the user interface of the V3 printer driver is displayed as illustrated in FIG. 10.

The V3 printer driver of the client 402 starts the installation of the V4 printer driver at a time when print processing in step S701 is finished. Instead of step S701, however, the start of the installation can be triggered by the display of the user interface of the device application 307.

The V3 printer driver of the client 402 displays a toast in step S705 and leaves the selection of installation to the user, but can install the V4 printer driver without asking the user by skipping steps S705 and S706.

After the installation of the V4 printer driver is completely finished, the V3 printer driver of the client 402 can create an environment of only the installed V4 printer driver by instructing the operating system to uninstall the V3 printer driver.

Thus, the installation of the V4 printer driver is finished without a user's operation on the client 402 by the V3 printer driver of the client 402 being automatically connected to the shared printer queue of the V4 printer driver of the server 401 for installation. The user can know the automatic installation so that transition to the new printer driver can swiftly performed. The installation is easy even in a large enterprise environment with a high level of security awareness because the operating system 1053 does not have to be changed and there is neither service nor resident application in an environment of the client 402. There is no need for the server 401 to have a database related to the client 402 and thus the management cost can be reduced.

According to exemplary embodiments of the present invention, the operational burden of the client can be reduced by causing the client to automatically install the printer driver even in a shared printer environment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-039891, filed Mar. 2, 2017, which is hereby incorporated by reference herein in its entirety.

What is claimed is:

1. A system comprising:
a client; and
a server,
wherein the server comprises an addition unit configured to add a path of a logical printer corresponding to a second printer driver to setting information regarding a first printer driver registered in a database of the server,
wherein the path of the logical printer is added to setting information regarding the first printer driver registered in a database of the client by addition of the path of the logical printer to the setting information of the database of the server, and
wherein the client comprises an installation unit configured to install the second printer driver based on the path of the logical printer added to the setting information of the database of the client by the first printer driver being operated.

2. The system according to claim 1,
wherein the server further comprises an installation unit configured to install the second printer driver, and
wherein the addition unit adds the path of the logical printer corresponding to the installed second printer driver to the setting information of the database of the server.

3. The system according to claim 2,
wherein the server further comprises a determination unit configured to determine whether the first printer driver registered in the database of the server has a version allowing installation of the second printer driver, and
wherein, if the determination unit determines that the version of the first printer driver does not allow the installation of the second printer driver, the installation unit of the server updates the first printer driver by installation.

4. The system according to claim 1,
wherein the client further includes a display unit configured to display a confirmation window to see whether a user confirms installation of the second printer driver, and
wherein, if an instruction to install the second printer driver is received from the user via the confirmation window, the installation unit installs the second printer driver based on the path of the logical printer added to the setting information of the database of the client.

5. The system according to claim 4, wherein the display unit displays a notification screen that notifies the user that the second printer driver has been installed.

6. The system according to claim 1, wherein the client further includes an uninstallation unit configured to uninstall the first printer driver after installation of the second printer driver by the installation unit of the client is finished.

7. A control method for a system comprising a client and a server,
wherein the server comprises adding a path of a logical printer corresponding to a second printer driver to setting information regarding a first printer driver registered in a database of the server,
wherein the path of the logical printer is added to setting information regarding the first printer driver registered in a database of the client by addition of the path of the logical printer to the setting information of the database of the server, and
wherein the client comprises installing the second printer driver based on the path of the logical printer added to the setting information of the database of the client by the first printer driver being operated.

* * * * *